United States Patent [19]

Lynch et al.

[11] 4,348,420
[45] Sep. 7, 1982

[54] PROCESS FOR BINDING COMMINUTED MEAT

[75] Inventors: Cheryl J. Lynch, Midland Park, N.J.; Chifa F. Lin, Irvington; Nicholas Melachouris, White Plains, both of N.Y.

[73] Assignee: Nutrisearch Company, Cincinnati, Ohio

[21] Appl. No.: 181,253

[22] Filed: Aug. 25, 1980

[51] Int. Cl.³ .............................................. A23L 1/31
[52] U.S. Cl. .................................. 426/272; 426/646; 426/652; 426/657
[58] Field of Search ............... 426/641, 646, 573, 575, 426/578, 652, 657, 518, 519, 802, 583, 272, 574

[56] References Cited

U.S. PATENT DOCUMENTS

| | | | |
|---|---|---|---|
| 2,634,211 | 4/1953 | Komarik | 426/646 X |
| 2,786,764 | 3/1957 | Rivoche | 426/646 X |
| 2,957,770 | 10/1960 | Freund et al. | |
| 2,964,409 | 12/1960 | Sair | 426/646 |
| 2,992,925 | 7/1961 | Green et al. | 426/573 X |
| 3,202,514 | 8/1965 | Burgess et al. | |
| 3,380,832 | 4/1968 | Bone | 426/272 X |
| 3,506,455 | 4/1970 | Savage et al. | 426/646 X |
| 3,873,749 | 3/1975 | Carpenter et al. | |
| 3,930,056 | 12/1975 | Feminella et al. | 426/641 X |
| 3,974,296 | 8/1976 | Burkwall | 426/646 X |
| 4,161,552 | 7/1979 | Melachouris | 426/646 |
| 4,168,322 | 9/1979 | Buckley et al. | 426/657 X |
| 4,191,781 | 3/1980 | Schara et al. | 426/641 X |
| 4,214,009 | 7/1980 | Chang | 426/583 X |
| 4,259,363 | 3/1981 | Lauck et al. | 426/652 X |

FOREIGN PATENT DOCUMENTS 1266622  4/1968  Fed. Rep. of Germany .

OTHER PUBLICATIONS

Hermansson et al., "Functional Properties of Added Proteins Conducted with Properties of Meat Systems", *Journal of Food Science*, (40), 1975, pp. 595–602.
Chem. Abstracts 71, 122535q, (1969); 75, 87157b, (1971); 85, 4007k, (1976).
*Dairy Based Ingredients for Food Products*, pp. 1–24.
*A Fresh Look at Dairy Based Ingredients for Processed Foods*, pp. 1–13.
"Dairy Based Ingredients–Their Expanding Role in Non-Dairy Processed Foods", *Food Processing*, pp. 40–43, 10-1977.
Lee et al., "Whey Protein Concentrates for a Processed Meat Loaf", *Journal of Food Science*, vol. 45, (1980), pp. 1278, 1279 & 1304.
*Whey Proteins and Modern Food Processing*, 6-1977, pp. 1–26.
*Handbook of Food Additives*, pp. 343–344.
Lauck et al. (I), "The Functionality of Binders in Meat Emulsions", *Journal of Food Science*, vol. 40, (1975), pp. 736–740.

*Primary Examiner*—Arthur L. Corbin
*Attorney, Agent, or Firm*—Cushman, Darby & Cushman

[57] ABSTRACT

Comminuted meats can be effectively bound using a blend of water soluble protein-containing material, such as alkali metal caseinates, and a hydrocolloid. Preferably, the blend also includes a byproduct resulting from the concentration of whey protein from whey. The products are effective meat binders for comminuted meats and particularly non-specific loaves.

13 Claims, No Drawings

PROCESS FOR BINDING COMMINUTED MEAT

BACKGROUND OF THE PRESENT INVENTION

This invention relates to the binding of comminuted meats using blends of water-soluble proteins and a hydrocolloid and particularly where the protein blend contains water solids casein salts and the whey solids obtained as byproducts from the concentration of whey protein from whey.

Because of the increasing requirement for protein sources throughout the world, various processes have been recently developed to extract protein from whey. Particular reference is made to the Dienst Attebery patent, U.S. Pat. No. Re. 27,806, which discloses a method of separating protein from cheese whey by means of a molecular sieve resin, more commoly known as gel filtration. Also in active use is the technique of ultrafiltration to separate and concentrate the protein from the whey. The development of these separation techniques has also raised further processing problems. The byproducts from these processes are difficult to handle because they are highly hygroscopic.

In the processing of cheese whey by molecular sieve resin, a low molecular weight fraction (about 5–10% solids) is obtained which has a solids composition of mainly lactose and minerals with residual protein. The solids in this low molecular weight fraction can be described more particularly by the following typical chemical analysis.

| | |
|---|---|
| Lactose, % | 40–50 |
| Minerals, % | 25–35 |
| Protein (N × 6.38), % | 15–20 |
| Lactic Acid, % | 7–10 |
| Citric Acid, % | 3–6 |
| Fat, % | less than 1 |
| Moisture | less than 5 |
| pH | 6.6–7.2 |

Similarly, the use of ultrafiltration provides a permeate which is high in minerals and lactose. The solids in the permeate can be described more particularly by the following typical chemical analysis.

| | |
|---|---|
| Lactose, % | 70–80 |
| Minerals, % | 10–15 |
| Protein, (N × 6.38), % | 4–8 |
| Lactic Acid, % | — |
| Citric Acid, % | — |
| Fat, % | less than 1 |
| Moisture | less than 5 |
| pH | 6–7 |

After removing the lactose by normal lactose crystallization procedures, the now delactosed permeate contains about 40–45% lactose, about 25–35% minerals and about 8–12% protein (TKN×6.38).

The use of the byproduct of the molecular sieve fractionation of whey as a flavor enhancer in foods is taught in U.S. Pat. No. 3,930,056. In addition, this patent teaches that the byproduct of the molecular sieve fractionation of the whey is useful in comminuted meat compositions as it exhibits a binding effect in addition to the flavor enhancement effect. While the byproduct from the molecular sieve fractionation of whey is an effective meat binder and flavor enhancer in comminuted meats, there still exists areas under the broad term of comminuted meat where less than excellent performance is achieved. This generally includes the area of sandwich loaves.

In preparing sandwich loaves, the binder must emulsify the fat and water in contrast to franks where there is more latitude on water loss. Whey byproducts have not been effective in extending sandwich loaves though the byproducts can be used effectively in franks (The Functionality of Binders in Meat Emulsions, R. M. Lauck, Journal of Food Science, Volume 40, 1975 at pages 736–740). Various gums such as locust bean gum, guar gum, karaya gum and carrageenan have been reported to act as water binding and product appearance agents in meat (Handbook of Food Additives, 2nd (1972) Chemical Rubber Company at pp. 343–344).

While many materials have been advocated for use in binding the water and fat of meat, one product is consistently used in the industry, i.e., calciumreduced skim milk powder. This material has provided the best yields under the severe conditions of chopping, which in the industry can extend over a long period of time. Many binders show good binding effect (based on yield) during the early chopping stages (cf Assignee's copending application Ser. No. 6,817, now U.S. Pat. No. 4,259,363, which discloses a binder for comminuted meat of a blend of deproteinized whey byproducts with from 5–50% casein or its salts). Some of these binders rapidly fall-off in yield as the chopping is continued. The ideal material would provide high yields at the initial stages of chopping without significant fall-off in yield as chopping is continued.

Because of the extensive quantity of whey available, researchers are attempting to obtain new uses for whey protein and hence producing more whey byproducts. While it has been shown that these products can be effectively used in meat binders, the problem of fall-off in yield after extensive chopping still remains. In preparing sandwich loaves, the binder must emulsify the fat and water in contrast to sausage-like frankfurters where there is more latitude on water loss. Some of the whey byproducts have not been effective in binding sandwich loaves though they can be used effectively in other areas.

It has now been found that the problem of fall-off in yield during the preparation of a comminuted meat product can be overcome in accordance with the present invention.

BRIEF SUMMARY OF THE INVENTION

In accordance with the present invention, it has now been found that comminuted meats can be prepared by using as a total or partial binder therefor, a blend of a water soluble protein and a water soluble hydrocolloid. Preferably, the water soluble protein blend contains water soluble alkali metal caseinates. Also, it is preferred that the water soluble protein blend includes byproducts resulting from the concentration of whey protein from whey.

As used herein, the term "binder" is intended to cover the functions of binding fat and water. For those amounts above that needed for binding, the binder can perform the function of an extender and it is intended that the term "binder" as used herein also includes that function.

The following discussion will be directed to the preferred water soluble protein, alkali metal caseinates, though the discussion is intended to apply to all water soluble protein within the scope of the invention.

DETAILED DESCRIPTION OF THE PRESENT INVENTION

The meat binder blends of the invention contain water soluble proteins preferably derived from animal or vegetable and more preferably from dairy (lacteal fluid) sources. It is preferred that the blend also includes byproducts from the concentration of whey which are preferably codried with a hydrocolloid to obtain the meat binder of the invention.

WATER SOLUBLE PROTEIN

The protein material for use in the compositions of the invention is a water soluble protein-containing material derived from animal or vegetable sources, preferably, lacteal fluid or vegetable and most preferably, from lacteal fluid sources. Water soluble protein-containing compositions derived from lacteal fluid include whole milk, skim milk, non-fat dry milk (NFDM), alkali metal caseinates (preferred) such as sodium and potassium, whey, whey protein concentrates prepared by physical or chemical separation techniques, electrodialyzed whey, delactosed whey, byproducts from the concentration of whey protein from whey and mixtures thereof. Other animal proteins include blood proteins, and solubilized meat protein. The vegetable proteins are illustrated by oil seed cake proteins such as soy protein concentrate, soy protein isolate and soy whey.

Casein is obtained by the acid (direct addition or enzyme formation) coagulation of the protein from a milk source at its isoelectric point (4.6) as is well known in the art. Because of its general insolubility in water at its isoelectric point, casein is generally utilized in the form of its salts, also known as caseinates. The salts can be formed by neutralizing the casein with an alkali such as sodium hydroxide or the salts can be formed in situ such as by mixing casein with a salt containing solution or in the meat. The latter is less preferred since sufficient time is not available for complete salt formation and hence, complete water solubility. As used herein, the term "caseinate" is intended to include caseinates formed by solubilizing casein in situ in the binder or in the meat in addition to caseinates formed by neutralization. The alkali metal is preferably sodium or potassium. The most preferred salt of casein is the sodium salt, i.e., sodium caseinate. If a product for a low sodium diet is required, potassium caseinate can be used.

The whey protein concentrates which can be used in the invention can be prepared by various physical techniques including molecular sieve fractionation (U.S. Pat. No. 27,806), Ultrafiltration (Horton, B.S. et al., Food Technology, Vol. 26, p. 30, 1972), reverse osmosis ("Fractionation and Concentration of Whey by Reverse Osmosis" by Marshall, P. G., Dunkley, W. L. and Lowe, E., Food Technology, Vol. 22(a), pp. 969-1968), dialysis and electrodialysis (Desalting By Electrodialysis, by Friedlander, H. Z., and Rickles, R. W., Chem. Engineering, May 23, 1966, p. 153) and the like. The preferred technique is ultrafiltration (discussed more fully hereinafter). The protein can also be chemically separated such as by the use of phosphate (U.S. Pat. Nos. 2,377,624 and 4,043,990) or sodium lauryl sulfate precipitation (U.S. Pat. Nos. 4,029,825 and 4,058,510). A whey protein concentrate is defined as a product which has been treated in such a way to increase the protein content of the dry product from its normal content of about 11% to an increased level of about 25% protein based on total Kjeldahl nitrogen. Upper limits of up to 95% can be obtained. Preferably, the whey protein concentration ranges from about 40% to about 60% by weight.

WHEY BYPRODUCTS

The products of the invention preferably contain certain whey byproducts in addition to the other water-soluble proteins described above. These byproducts can be derived from either acid or sweet cheese whey which has been processed to remove a part of the protein content thereof. As used herein, the term "whey byproducts" is particularly intended to include the second fraction obtained from the molecular sieve separation of cheese whey as described in U.S. Pat. No. 27,806, the permeate obtained from the ultrafiltration concentration of protein from whey, and delactosed permeate in either liquid or dried form.

The low molecular weight second fraction is the material obtained by passing a partially delactosed cheese whey mother liquor through a bed of molecular sieve resin in accordance with U.S. Pat. No. Re. 27,806 and recovering, for the purposes of this invention, the low molecular weight second fraction containing mainly lactose, minerals and residual protein. The partially delactosed whey mother liquor is obtained by concentrating raw cheese whey by conventional means to a solids concentration of about 60%, reducing the temperature of the concentrate to induce lactose crystallization and thereafter separating crystalliine lactose from the liquid by conventional means.

If desired, the dairy whey used in preparing the whey protein concentrates and the byproducts can be pretreated to clarify the whey using processes such as illustrated by that disclosed in U.S. Pat. No. 3,560,219. In accordance with this patent, lipid is removed as a precipitate from whey by treating the whey solution with calcium ion at approximately a neutral pH. Acid whey containing blends can be clarified by elevating the pH to neutral as disclosed in U.S. Pat. No. 4,036,999.

Preferably, the whey stream used in the gel filtration fractionation of whey is clarified prior to delactosing.

Also effective in the invention is the permeate obtained from the ultrafiltration of cheese whey. Ultrafiltration membranes are utilized to separate the high molecular weight fraction of the whey (protein) from the liquid and low molecular materials, i.e., low molecular weight protein, lactose and ash in the whey solution. The protein enriched solution is retained on the membrane and it is called the retentate. The water and low molecular weight fraction passes through the membrane and is called the permeate.

In an illustrative method for ultrafiltering cheese whey, the acid or cottage cheese whey concentrate containing from about 40% to about 60% and preferably 50%±5% whey protein is prepared by neutralizing acid whey to a pH of 6.5 with caustic. After storage, the pH is then adjusted to 7.2 and any solids or precipitates are removed by centrifugal clarification. The clarified liquor is then pasteurized and fed into the ultrafiltration membrane unit. The retentate is condensed and spray dried. The liquid permeate is then used in the process of the present invention.

The permeate can be dried as is or concentrated and/or delactosed by concentration and cooling to effect a precipitation of a lactose. The drying of the permeate or delactosed permeate (DLP) can be facilitated by the use of drying adjuvants such as starch and alkali metal caseinates.

The raw cheese whey source used in preparing the whey protein concentrates and whey byproducts used in the invention can be acid cheese whey, sweet cheese whey, or mixtures thereof. More particularly, the raw cheese whey can be cottage cheese whey, casein whey, cheddar cheese whey, mozzarella cheese whey, Swiss cheese whey or mixtures thereof. Preferably, raw cheese whey used in connection with the molecular sieve fractionation is a blend of cottage cheese whey and cheddar cheese whey. The preferred cheese whey for use in the ultrafiltration fractionation of whey is acid cheese whey.

HYDROCOLLOID

The hydrocolloids which can be used in the present invention include any of the edible gums or protecive colloids such as carrageenan, alginates, such as sodium or potassium alginate, carboxymethylcellulose and salts thereof, acacia, karaya, guar, locust bean gum, xanthan, starch, carboxymethyl starch and salts thereof and mixtures thereof. The preferred hydrocolloid is carboxymethylcellulose or carboxymethyl starch and more preferably, carboxymethylcellulose. These materials are generally used in the salt form, the sodium salt being preferred. The description of the invention will be directed to the preferred hydrocolloid carboxymethylcellulose though it is to be understood that this is not intended to limit the invention thereto.

Carboxymethylcellulose or CMC is a water-soluble cellulose ether generally available as the sodium salt. CMC is known to have molecular weights which range from about 21,000 to 500,000. CMC is commercially available in viscosities ranging from about 10,000 cps in 1% solution to 25 cps in 2% solution and even lower viscosities. It is preferred that the CMC used in the present invention provides a viscosity within the range of from about 1,000 cps to about 10,000 cps in a 1% solution at 25° C.

The amount of hydrocolloid used will vary depending on type and end use. In general, the hydrocolloid should be used in an amount sufficient to provide the necessary binding action. The hydrocolloid and particularly the carboxmethylcellulose is used in an amount ranging from about 0.5% to about 50% and preferably from about 1% to about 20%, more preferably from about 1% to about 10% and most preferably from about 1% to about 5% based on the weight of the binder. The remainder is water soluble protein, preferably, caseinate alone or in combination with other water soluble proteins. As the amount of CMC in the meat increases, the tendency of the meat to evidence textural deficiencies increases, i.e., becoming softer and tending to fall apart under short chopping times, requiring longer chopping times for textures equivalent to that obtained at lower CMC levels. For emulsions prepared under long chopping times, the use of larger amounts of CMC may be advantageous.

The amount of CMC in the meat depends on the amount of CMC in the binder and the loading of the binder in the meat. However, CMC levels above about 5% are not preferred. CMC levels of from about 0.01% to about 4% and preferably from about 0.01% to about 2%, more preferably from about 0.01% to about 1% and most preferably from about 0.01% to about 0.5% based on the weight of the meat and binder are suggested. Slight adjustments may be required depending on the area of use but these adjustments are well within the skill of the art.

The remainder of the binder (from about 99.5% to about 50%) is comprised principally of the water soluble protein material. If desired, less than 50% and preferably less than 25% of the weight of the binder less the weight of the CMC can be comprised of fillers such as water insoluble protein, starch and sugars and the like. Preferably, no fillers are used. The numerical limitations relating to the binder do not include optional ingredients which may be included in the binder such as flavorings, flavor enhancers, preservatives, color, and the like. The remainder of the binder can be any one of the water soluble proteins mentioned hereinbefore such as caseinate, whey protein concentrate, or whey byproducts or mixtures thereof. Since permeate and delactosed permeate and particularly the latter are very difficult to dry separately, they must be used as liquids or dried with drying agents such as starch or caseinates. Delactosed permeate if used alone with the hydrocolloid must be used as a liquid.

In the preferred form of the present invention, the water soluble protein blends comprise whey byproducts and casein salts. Small percentages (up to 25% of the water soluble protein material in the binder) of other water soluble proteins can be included if desired. These binders can be prepared by dry blending the ingredients or preferably, by codrying the whey byproduct, particularly the delactosed permeate solution, with the casein salts. The preferred hydrocolloid carboxymethylcellulose can be dry blended with the codried blends or added to the ingredients prior to drying.

In accordance with the invention, casein or its salts can be added to the whey byproduct in the composition in any ratio such as 99:1 to 1:99 and preferably, in a ratio ranging from about 5:95 to about 95:5. More preferably, the ratio ranges from about 75:25 to about 25:75 and most preferably, from about 25:75 to about 50:50 by weight based on total dry solids weight of the binder minus the hydrocolloid. The casein salts can be added as preformed caseinates or by dissolving the casein in the liquid whey protein byproduct solution by an appropriate pH adjustment. Casein, itself, can be used if the meat system or the binder system has a pH above casein's isoelectric points so that the casein can become soluble. This is less preferred since complete solubilization in situ is often not possible resulting in the possibility of a gritty tasting product.

The numerical limitations relating to the water soluble whey protein containing material is based on the total weight of the material and not on a protein weight basis.

The hydrocolloid can be blended with the dry ingredients or with the liquid ingredients and codried as desired. If the hydrocolloid is a dry powder, dry blending is preferred. It is preferred in the case of the binder containing sodium caseinate, DLP and carboxymethylcellulose that the product be prepared by reacting casein with caustic to form sodium caseinate followed by blending in liquid DLP at 35% solids. The mixture is pasteurized and spray dried. Carboxymethylcellulose is then blended with the dry mixture.

The binder blends of the invention can be dried by any known means. Preferably, an atomizing type dryer, illustrated by a spray dryer, fluid bed dryer or flash or vacuum dryer, is utilized.

As used herein, drying atmosphere is also intended to cover a negative pressure atmosphere such as used in a flash or vacuum evaporator.

In a conventional spray dryer, the inlet temperature is usually heated within the range of from about 168° C. to about 182° C. and the corresponding outlet temperature usually ranges from about 110° C. to about 116° C. The temperature in the dryer is not critical with the exception that the temperature must be high enough to effectively dry the product yet insufficient to cause burning or browning. The parameters of the dryer as well as the conditions generally employed such as feed rate, residence time and the like can be easily discerned by one skilled in the art.

If desired, one can also include a small proportion of a drying agent or a flow control agent selected from the group consisting of tricalcium phosphate, dicalcium phosphate, kaolin, diatomaceous earch, silica gel, calcium silicate hydrate and mixtures thereof.

The blend of the whey byproduct solution, the caseinate and hydrocolloid is dried with greater facility and is less hygroscopic than the whey byproduct alone. The product is substantially non-caking which facilitates the use of the product.

The blends of the invention provide improved quality comminuted meat products over and above the quality obtained using certain currently available meat binders. These improvements include water and flavor stabilization which are greater than that provided with current binders such as non-fat dry milk and calcium reduced skim milk powder.

By comminuted meat is meant herein, comminuted meat food products prepared from one or more kinds of skeletal muscle meat or skeletal muscle meat and poultry meat. Cooked sausage can be defined as those comminuted meat products defined by the U.S. Department of Agriculture in 9 C.F.R., Section 319.180, for example, frankfurter, weiner, bologna, garlic bologna, knockwurst and similar products. In addition to the sausage products described above, comminuted meat further includes beef patties (9 C.F.R., Section 319.15).

It has been found that the products of the invention are particularly effective in binding and if desired, extending non-specific loaves as defined in 9 C.F.R., Section 319.280.

Non-specific loaves include the luncheon meat loaves which are generally chopped or ground meat of pork, beef, veal or lamb, poultry molded into a square shape and which can contain cereals, soy and non-fat dry milk as well as other non-cereal extenders and if desired, flavorings such as choppd nuts, olives, cooked macaroni, pistachio nuts, dried cheese and the like. The meat binder for these loaves is generally non-fat dry milk. Effective emulsification of the comminuted meat used in preparing these loaves can be accomplished using the blends as described hereinbefore in place of all or a portion of the non-fat dry milk normally used.

The blends described hereinbefore can be added to comminuted meats alone or in combination with other binders in bindingly effective amounts.

As used herein, bindingly effective amount is defined as that amount of the binder of the invention and any added binder which increases the binding of fat and water, i.e., increased yield, over a like sample without the binder of the invention. The term "bindingly effective amount" is intended to relate primarily to increased yield. Amounts of binder ranging from about 1% to about 35%, preferably from about 1% to about 15% and more preferably from about 3% to 12% by weight based on the weight of the comminuted meat product can be used. In connection with cooked sausage, as defined above, the present legal limit for binders is 3.5% by weight. The blends of the invention are effective in cooked sausage in place of or in combination with known binders. In non-specific loaves as defined above, there is no legal limit on the amount of binder which can be used but the product must contain at least 65% meat. In non-specific loaves, it is preferred to utilize the binder in replacement amounts for the binders presently used (non-fat dry milk). The binders in non-specific loaves are presently used in amounts ranging from about 1% to about 15% based on the total weight of the comminuted meat. The preferred amounts for non-specific loaves range from about 6% to about 12% by weight based on the final weight of the loaf. Since the blends of the invention are compatible with existing binders, both total and partial replacements of existing binders are included within the invention. Thus, combinations of the blends of the invention with known binders, such as calcium reduced skim milk powder, can be made.

Because of the wide range of meat products and their varying requirements, it has also been found that the preferred binder system of water soluble protein/hydrocolloid/whey byproduct can be adapted to many specific uses. This can be accomplished in accordance with the invention either by increasing or decreasing the amount of water soluble protein: hydrocolloid relative to the amount of whey byproduct, or by blending the casein material with a non-casein containing material such as fillers, or water soluble or insoluble protein sources, carbohydrates and the like. Effective results can be achieved utilizing blends of the invention in combination with non-water soluble protein (caseinate) containing material such that the total amount of water soluble protein (casein or its salts) is within the range specified hereinbefore.

Blends of the present invention can also be used in food products as a flavor enhancing agent, flavor agent or a binding agent in such products as soups, stews, sauces, gravies, breadings, batters, salad dressings including imitation mayonnaise, baked goods, frozen desserts, chip dips, cheese spreads, process cheese foods, spray dried cheeses and the like.

The present invention is further illustrated in the examples which follow. As used in the following examples, CMC is intended to refer to sodium carboxymethylcellulose, DLP is intended to refer to delactosed permeate. The CMC used was obtained from Hercules, Inc. under the desigation 7 HF. Variability in data for similar formulations is due to different meat samples, and variability in the conditions under which samples are prepared such as temperature, time and sample preparation technique.

EXAMPLE 1

A sodium caseinate—Delactosed Permeate (DLP)—Carboxymethylcellulose (CMC) physical blend in a weight ratio of 63.4:21.5:15. (on a total solids basis) is prepared by first dry blending the caseinate and CMC. The DLP is then added as a liquid. The resulting blend is dried in an oven at 40°-50° C. overnight to remove excess water.

The binders of the invention were tested in the following model meat emulsion system:

Three grams of NaCl were dissolved in 33 grams of water. The brine was added to 164 grams of ground beef having a fat content of 20-25% (usually chuck) and the combination mixed for one minute in an Omni Mixer at full speed with scraping after ½ minute. After the meat, salt and water were blended, the binder was added and the composition was mixed in the Omni Mixer for 2½ minutes with scraping after ½ and 1½ minutes. Two 100 gram samples were placed in beakers, covered with aluminum foil, cooked for 40 minutes in an 80° C. water bath to reach an internal temperature of about 68.5°-71° C. The loaves were removed from the beakers, blotted gently and weighed. The weight is equal to percent yield because the starting weight was 100 grams.

The following results were obtained using the binder of Example 1 at various binder levels as compared to similar emulsions prepared with one of the standard binders of the industry, calcium reduced skim milk.

TABLE I

| | % TOTAL YIELD | |
|---|---|---|
| BINDER % | CASEINATE/DLP/CMC | Ca-REDUCED SKIM MILK |
| 2 | 70.5 | 68.5 |
| 4 | 75.9 | 70.6 |
| 6 | 90.4 | 74 |
| 6 | 94.2 | — |
| 8 | 93.6 | 74.4 |

The binding effect of caseinate-DLP-CMC binders at various proportions in the model meat system at a 4% binder level is set forth in the following data:

TABLE II

| COMPOSITION % | | | |
|---|---|---|---|
| Na CASEINATE | DLP | CMC | % YIELD |
| 63.5 | 21.5 | 15.0 | 95.5 |
| 51.25 | 34.81 | 13.94 | 94.0 |
| 75.75 | 10.31 | 13.94 | 96.0 |
| 63.50 | 19.38 | 17.12 | 95.8 |

The effectiveness of various other proportions of sodium caseinate-DLP-CMC at a 4% binder level are determined in the model meat emulsion using another batch of meat as shown in Table III as follows:

TABLE III

| COMPOSITION % | | | |
|---|---|---|---|
| Na CASEINATE | DLP | CMC | % YIELD |
| 85 | — | 15 | 97.3 |
| 100 | — | — | 85.9 |
| 60 | — | 40 | 97.7 |
| 60 | 20 | 20 | 94.8 |
| 60 | 30 | 10 | 92.0 |
| 60 | 40 | — | 79.7 |
| Control* (Calcium-reduced skim milk) | | | 76.8 |

*Used at 6% binder level - closer to recommended use level for that product.

Further comparisons of various proportions of binder ingredients in the model meat emulsion is shown in Table IV at a 4% binder level:

TABLE IV

| COMPOSITION % | | | |
|---|---|---|---|
| Na CASEINATE | DLP | CMC | % YIELD |
| 45.0 | 47.0 | 8.0 | 78.5 |
| 75.0 | 17.0 | 8.0 | 81.6 |
| 45.0 | 43.0 | 12.0 | 77.7 |
| 75.0 | 13.0 | 12.0 | 87.3 |
| 38.8 | 51.2 | 10.0 | 74.9 |
| 81.2 | 8.1 | 10.0 | 82.7 |
| 60.0 | 32.8 | 7.2 | 79.0 |
| 60.0 | 27.2 | 12.8 | 81.5 |
| 60.0* | 30.0 | 10.0 | 78.8 |
| 60.0* | 30.0 | 10.0 | 89.9 |

TABLE IV-continued

| COMPOSITION % | | | |
|---|---|---|---|
| Na CASEINATE | DLP | CMC | % YIELD |
| 60.0* | 30.0 | 10.0 | 75.7 |
| 60.0* | 30.0 | 10.0 | 83.7 |
| 60.0* | 30.0 | 10.0 | 84.1 |
| — | — | 100.0** | 77.7 |
| Control (6% level) - Calcium reduced skim milk | | | 78.8 |
| Control (4% level) - Calcium reduced skim milk | | | 67.9 |

*Formulations identical for determining central point for statistical analysis. It is run five times for error analysis.
**Evaluated at 0.6% level.

EXAMPLE 2

Due to the fact that methyl cellulose is currently approved for use at a level of 0.15% in meat patties (9 C.F.R. 318.7), methyl cellulose was compared to carboxymethylcellulose in a binder system of 70% DLP:30% sodium caseinate. The following blends were tested in the model meat emulsion at a 6% binder level with the corresponding results:

TABLE V

| BINDERS | % YIELD | |
|---|---|---|
| 70:30 DLP:Caseinate | 68.5 | |
| 65.8:28.2:6 DLP:Na Caseinate:CMC | 82.0 | |
| 65.8:28.2:6 DLP:Na Caseinate: Methylcellulose | 60.6 | 67.7 |
| 68.25:29.25:2.5 DLP:Na Caseinate: Methyl/cellulose (equal to 0.15% of final cooked loaf) | 61.1 | 62.8 |
| Control (Calcium reduced skim milk) | 63.1 | 74.9 |

As can be seen, the use of methyl cellulose does not improve the percent yield whereas CMC does.

EXAMPLE 3

Various meat binders were prepared to determine the effect of CMC on meat binders containing DLP in a 50:50 ratio to sodium caseinate. Samples were prepared using the model meat emulsion system set forth in Example 1. All binders were used at a 6% level. The following results were obtained:

TABLE VI

| Ratio 50 DLP:50 Sodium Caseinate Blend to CMC | | Average Yield % | |
|---|---|---|---|
| | | Sample 1 | Sample 2 |
| A. | 100:0 | 75.7 | 77.9 |
| | 98:2 | 77.1 | 77.7 |
| | 96:4 | 77.8 | 76.5 |
| | 93:7 | 85.1 | 84.9 |
| | 90:10 | 83.5 | 79.9 |
| Control (Calcium reduced skim milk) | | 80.0 | 77.1 |
| B. | 100:1 | 72.9 | 73.2 |
| | 94:6 | 76.6 | 77.6 |
| Control (Calcium reduced skim milk) | | 71.3 | 72.3 |
| (A and B denote experiments run on separate days) | | | |

Using a 50 DLP:50 sodium caseinate ratio blend, the substitution of a part of the blend by CMC does not show significant improvement until a 6% level is used though the use of 2% shows a slight improvement over the DLP:sodium caseinate blend.

EXAMPLE 4

Various meat loaves using the binders of the invention were prepared as follows:

| FORMULATION | | |
|---|---|---|
| Meat | 10.9 kg | Lean Beef (Round) |
| | 6.4 kg | Pork Hearts |
| | 10.0 kg | Fat Pork (Jowls) |
| Cure | 4.09 kg | Water |
| | .54 kg | NaCl |
| | 4 g | NaNO$_2$ |
| | 14.5 g | Sodium Erythorbate |

PROCESS

Each of the meats was ground separately through a meat grinder with a plate having a 0.94 centimeter opening.

The ground beef, one half of the water, the salt and the NaNO$_2$ were placed in a paddle mixer and mixed for five minutes. The fat pork and the pork hearts, and the balance of the water were added and the mixer run an additional five minutes. The sodium erythorbate was added and the mixer run an additional five minutes for a total mixing time of 15 minutes. The mixes were at 10.7° C. at the end of the mixing cycle. Each batch was ground through a meat grinder with a plate having 0.23 centimeter openings. Each batch was subdivided into about 4.1 kg portions, packaged and quick frozen.

For each test, a batch of 4.1 kg was thawed overnight. The meat was mixed with 123 grams of water and an appropriate amount of binder in a Hobart TM Mixer at speed 1 for two minutes. Nine samples of approximately 454 grams each at various binder percentages were chopped in a food processor (Cuisinart TM) at 0, 15, 30, 45, 60, 75, 90, 105 and 120 seconds. The loaves were packed in separate aluminum pans, vacuum evacuated (2 cycles) and covered with aluminum foil.

All loaves were chilled overnight at 1.7° C. and were then cooked according to the following schedule:

| | DRY BULB | WET BULB |
|---|---|---|
| Preheat | 71.1° C. | 65.5° C. |
| 30 Minutes | 71.1° C. | 65.5° C. |
| Increase to | 76.6° C. | 65.5° C. |
| until internal temperature of | 71.1° C. | |
| is reached (approximately two hours). | | |

Percent yields were calculated by weighing the loaves before and after cooking. Any juices were poured off prior to weighing.

The final cooked yields in percent are shown in Tables VII through X.

TABLE VII

| BINDER: | 70 DLP:30 Sodium Caseinate:0 CMC | | | | | | | | |
|---|---|---|---|---|---|---|---|---|---|
| % BINDER | CHOPPING TIME IN SECONDS | | | | | | | | |
| | 0 | 15 | 30 | 45 | 60 | 75 | 90 | 105 | 120 |
| 0 | 83.3 | 85.7 | 85.6 | 83.8 | 84.5 | 84.6 | 83.1 | 81.3 | 79.7 |
| 3 | 89.2 | 89.4 | 90.3 | 89.7 | 88.8 | 87.7 | 81.6 | 81.1 | 79.1 |
| 6 | 89.2 | 90.9 | 91.8 | 92.2 | 92.3 | 91.7 | 90.8 | 89.5 | 89.5 |
| 9 | 86.9 | 90.7 | 91.8 | 92.4 | 92.2 | 92.8 | 92.6 | 92.8 | 90.0 |
| 12 | 84.5 | 90.0 | 91.6 | 92.2 | 92.7 | 92.6 | 92.7 | 92.7 | 92.8 |
| 15 | 80.8 | 86.3 | 91.1 | 91.0 | 89.7 | 92.2 | 92.5 | 92.7 | 92.9 |

TABLE VIII

| BINDER: | 65.8 DLP:28.2 Sodium Caseinate:6 CMC | | | | | | | | |
|---|---|---|---|---|---|---|---|---|---|
| % BINDER | CHOPPING TIME IN SECONDS | | | | | | | | |
| | 0 | 15 | 30 | 45 | 60 | 75 | 90 | 105 | 120 |
| 0 | 84.9 | 87.8 | 88.5 | 88.3 | 88.3 | 86.2 | 84.5 | 83.5 | 82.9 |
| 3 | 88.5 | 91.1 | 92.6 | 93.3 | 93.5 | 93.7 | 91.9 | 89.8 | 86.3 |
| 6 | 89.8 | 93.3 | 94.2 | 94.7 | 94.5 | 95.1 | 95.2 | 95.1 | 95.2 |
| 9 | 86.8 | 93.7 | 95.9 | 96.6 | 95.6 | 95.7 | 95.6 | 96.0 | 96.5 |

TABLE IX

| BINDER: | 67.9 DLP:29.1 Sodium Caseinate:3 CMC | | | | | | | | |
|---|---|---|---|---|---|---|---|---|---|
| % BINDER | CHOPPING TIME IN SECONDS | | | | | | | | |
| | 0 | 15 | 30 | 45 | 60 | 75 | 90 | 105 | 120 |
| 0 | 84.9 | 87.7 | 88.5 | 88.3 | 88.3 | 86.2 | 84.5 | 83.5 | 82.9 |
| 3 | 88.1 | 91.7 | 92.7 | 92.9 | 92.3 | 90.7 | 90.1 | 87.3 | 84.9 |
| 6 | 90.5 | 93.9 | 94.7 | 94.9 | 93.1 | 95.2 | 94.9 | 94.5 | 94.1 |
| 9 | 88.9 | 93.4 | 95.1 | 95.1 | 95.3 | 95.4 | 95.8 | 96.1 | 95.6 |
| 12 | 85.7 | 91.3 | 94.4 | 94.7 | 95.6 | 96.0 | 96.2 | 95.9 | 96.0 |
| 15 | 86.9 | 92.9 | 93.7 | 95.6 | 95.3 | 96.1 | 96.4 | 97.1 | 96.8 |

TABLE X

| BINDER: | CALCIUM-REDUCED SKIM MILK POWDER | | | | | | | | |
|---|---|---|---|---|---|---|---|---|---|
| % BINDER | CHOPPING TIME IN SECONDS | | | | | | | | |
| | 0 | 15 | 30 | 45 | 60 | 75 | 90 | 105 | 120 |
| 0 | 85.8 | 88 | 88.5 | 86.3 | 85.8 | 85.7 | 84.4 | 80.8 | 80 |
| 3 | 89 | 91.8 | 92.3 | 92.6 | 92 | 91.3 | 90 | 88.9 | 87.3 |
| 6 | 90.9 | 92.8 | 93.5 | 93.7 | 93.3 | 93.9 | 92.9 | 92.5 | 91.6 |
| 9 | 90.7 | 92.4 | 93.3 | 94 | 93.8 | 94.1 | 94.1 | 94.3 | 94.3 |

TABLE X-continued

| BINDER: | CALCIUM-REDUCED SKIM MILK POWDER | | | | | | | | |
|---|---|---|---|---|---|---|---|---|---|
| % BINDER | CHOPPING TIME IN SECONDS | | | | | | | | |
|  | 0 | 15 | 30 | 45 | 60 | 75 | 90 | 105 | 120 |
| 12 | 87.1 | 92.5 | 93.4 | 94.4 | 94.6 | 94.7 | 95.3 | 94.5 | 95.9 |
| 15 | 86.0 | 90.7 | 91.8 | 92.4 | 93.4 | 93.2 | 92.9 | 93.3 | 93.6 |

A 70 DLP:30 sodium caseinate binder provided inferior in yield compared to yields obtained using calcium reduced skim milk at the 3% level particularly at longer chop times. The use of the 70 DLP:30 sodium caseinate binder at 6% was better than the 3% level particularly at long chop times but still below the performance of 6% calcium reduced skim milk. The addition of 6% CMC based on total binder weight greatly improved binder performance such that it was equal to or superior to the calcium reduced skim milk binder. At levels above 3% CMC in the binder, the loaves tended to become soft and mushy. At 3% CMC added the binder was more effective than the 70 DLP:30 sodium caseinate blend alone and equal to or superior to calcium reduced skim milk at chopping times up to 90 seconds. The use of 9% of the binder of 67.7 DLP:29.1 sodium caseinate:3% CMC produced soft, mushy loaves similar to 6% of the 65.8 DLP:28.2 sodium caseinate:6% CMC. This can be overcome by longer chopping times and is beneficial if longer chopping times are desired.

EXAMPLE 5

Two binders were prepared using 1% and 2% CMC, the remainder being DLP and sodium caseinate in a 70:30 ratio. These were tested using the procedure of Example 4. The following results were obtained:

TABLE XI

| BINDER: | 69.3 DLP:29.7 Sodium Caseinate:1 CMC | | | | | | | | |
|---|---|---|---|---|---|---|---|---|---|
| % BINDER | CHOPPING TIME IN SECONDS | | | | | | | | |
|  | 0 | 15 | 30 | 45 | 60 | 75 | 90 | 105 | 120 |
| 6 | 90.1 | 92.9 | 93.6 | 93.7 | 93.7 | 93.5 | 94.1 | 93.7 | 91.9 |
| 9 | 85.2 | 93.3 | 94.2 | 94.5 | 94.9 | 95.0 | 95.6 | 95.3 | 95.2 |
| 12 | 84.2 | 91.4 | 93.7 | 94.5 | 95.5 | 95.5 | 95.2 | 95.4 | — |
| BINDER: | 68.6 DLP:29.4 Sodium Caseinate:2 CMC | | | | | | | | |
| 9 | 88.0 | 93.5 | 93.9 | 94.9 | 94.9 | 95.3 | 95.9 | 95.9 | 96.0 |
| 15 | 89.1 | 93.7 | 94.3 | 94.7 | 95.0 | 95.3 | 94.9 | 94.7 | 94.9 |
| BINDER: | 70 DLP:30 Sodium Caseinate | | | | | | | | |
| 6 | 89.6 | 91.7 | 92.6 | 93.4 | 93.3 | 92.9 | 92.7 | 92.2 | 87.4 |
| Blank | 84.6 | 86.7 | 87.0 | 86.3 | 84.5 | 83.4 | 82.0 | 79.8 | 78.3 |

The blank (no binder) produced an emulsion which was strongly susceptible to overchopping. Decreases in yields after longer chopping times were noted. The addition of the binder of 70 DLP:30 sodium caseinate increased the binding ability and yield. Further increases in yield were obtained by adding CMC. At the 6% binder level, overchopping was possible using the DLP:sodium caseinate binder with or without 1% CMC. At binder levels of 9% or greater, all CMC containing blends were tolerant to overchopping. The texture of all loaves was similar, CMC containing binders provided a slightly redder color. When using binders at 12% and 15% use levels, caseinate flavor was detected. CMC did not have an effect on flavor.

EXAMPLE 6

Meat loaves were prepared using a binder of 68.6 DLP:29.4 sodium caseinate:2 CMC at dosage levels of 3%, 6%, 9%, 12% and 15% using the procedure outlined in Example 4. A blank and a control with 6% calcium reduced skim milk were also prepared. The results are reported in Table XI as follows:

TABLE XII

| BINDER: | 68.6 DLP:29.4 Sodium Caseinate:2 CMC | | | | | | | | |
|---|---|---|---|---|---|---|---|---|---|
| % BINDER | CHOPPING TIME IN SECONDS | | | | | | | | |
|  | 0 | 15 | 30 | 45 | 60 | 75 | 90 | 105 | 120 |
| 0 | 81.7 | 86.5 | 85.0 | 84.1 | 82.7 | 83.1 | 84.3 | 79.7 | 81.9 |
| 3 | 85.8 | 89.5 | 90.4 | 90.0 | 90.6 | 89.3 | 88.9 | 78.4 | 75.4 |
| 6 | 89.6 | 92.5 | 92.8 | 93.5 | 93.4 | 93.4 | 93.4 | 92.6 | 89.7 |
| 9 | 87.2 | 91.9 | 93.3 | 93.8 | 94.2 | 94.8 | 94.8 | 94.7 | 94.7 |
| 12 | 81.4 | 88.5 | 92.6 | 93.7 | 95.4 | 95.2 | 95.1 | 94.5 | 94.9 |
| 15 | 82.2 | 89.7 | 92.9 | 94.1 | 95.0 | 95.7 | 95.9 | 95.5 | 95.6 |
| Control (6% calcium reduced skim milk) | 88.6 | 90.2 | 91.3 | 91.5 | 92.1 | 91.6 | 90.6 | 89.1 | 88.7 |

The results using the binder of the invention show a pattern similar to that obtained using the calcium reduced skim milk control but a higher yield level is obtained. At a 9% usage level, the yields provided by the product of the invention level off and remain substantially constant over long chopping times whereas the yields for the calcium reduced skim milk control drop off as chopping is continued. At 9% usage level and higher of the binder of the invention, longer chopping times were required to achieve good emulsification and hence, a firm texture. A slightly firmer texture and better flavor were observed for the binder of the invention at a 6% use level vis-a-vis 6% calcium reduced skim milk.

What is claimed is:

1. A process for binding comminuted meat comprising comminuting meat in the presence of a bindingly effective amount of a blend comprising from about 99.5% to about 50% of a water soluble dairy protein-containing material derived from lacteal fluid, and from about 0.5% to about 50% of a hydrocolloid, selected from the group consisting of algin, carrageenan, guar, acacia, locust bean gum, carboxymethylcellulose and carboxymethyl starch, wherein said hydrocolloid is present in said comminuted meat in an amount ranging from about 0.01% to about 4% by weight based on the weight of the meat and binder blend before cooking.

2. The process as recited in claim 1 wherein said dairy protein-containing material is selected from the group consisting of sodium caseinate, potassium caseinate, whey protein concentrate and mixtures thereof.

3. The process as recited in claim 2 wherein said dairy protein-containing material further includes a whey byproduct selected from the group consisting of the byproduct from the gel filtration of whey, the permeate resulting from the untrafiltration of whey, and the delactosed permeate resulting from the ultrafiltration of whey.

4. The process as recited in claim 3 wherein said whey byproduct is the permeate or delactosed permeate resulting from the ultrafiltration of whey.

5. The process as recited in claim 4 wherein said dairy protein-containing material is sodium caseinate and said whey byproduct is the delactosed permeate resulting from the ultrafiltration of whey.

6. The process as recited in claim 5 wherein the ratio of sodium caseinate to delactosed permeate ranges from about 75:25 to about 25:75.

7. The process as recited in claims 2, 3, 5 or 6 wherein said hydrocolloid is carboxymethylcellulose.

8. The process as recited in claim 7 wherein said comminuted meat is sausage.

9. The process as recited in claim 7 wherein said comminuted meat is non-specific loaves.

10. The process as recited in claim 1 or 3 wherein said comminuted meat is sausage.

11. The process as recited in claim 1 or 3 wherein said comminuted meat is non-specific loaves.

12. The process as recited in claim 1 wherein said hydrocolloid is present in said binder blend in amounts ranging from about 1% to about 10%.

13. The process as recited in claim 1 wherein said bindingly effective amount ranges from about 1% to about 15% based on the weight of the meat and the binder blend before cooking.

* * * * *